April 25, 1967     J. P. OLIVER     3,315,697
LUBRICATED VALVE WITH MEANS TO RELIEVE SEALANT PRESSURE
Filed April 22, 1964
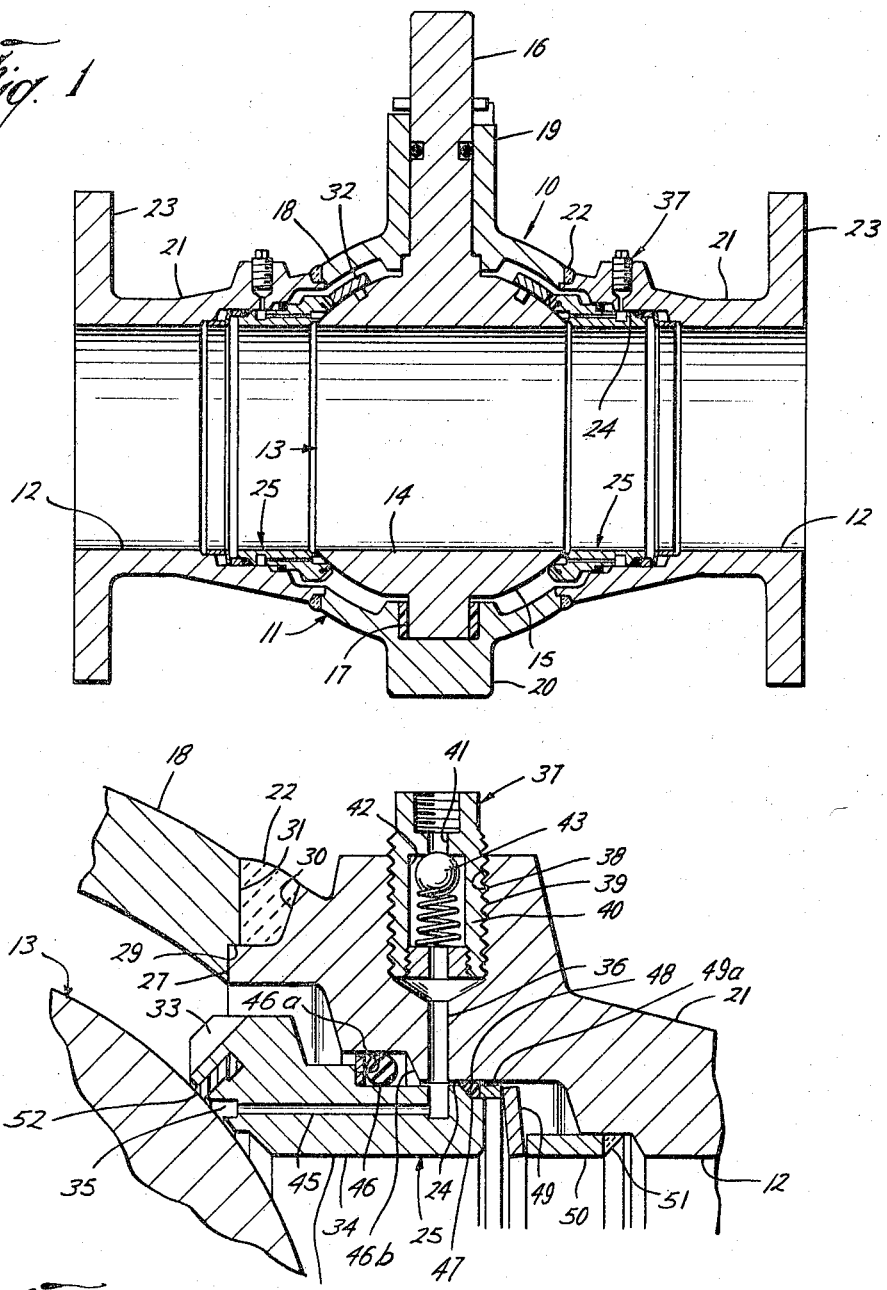
John P. Oliver
INVENTOR.
BY Brownings, Simms, Hyer & Eickenroht
ATTORNEYS

United States Patent Office 3,315,697
Patented Apr. 25, 1967

3,315,697
LUBRICATED VALVE WITH MEANS TO RELIEVE SEALANT PRESSURE
John P. Oliver, Houston, Tex., assignor to Cameron Iron Works, Inc., Houston, Tex., a corporation of Texas
Filed Apr. 22, 1964, Ser. No. 361,646
4 Claims. (Cl. 137—246.22)

This invention relates generally to valves; and, more particularly, to improvements in valves having one or more lubricated seats.

Many valve seats are sealably slidable within the flowway through the valve body so as to be urged toward seating position by upstream or downstream line pressure. In some cases, each seat is so arranged and constructed as to be urged toward seating position by whichever pressure is predominant whether it be upstream or downstream of the seat. Normally, a spring or other resilient means is employed to provide a force for initially urging the seat to seating position so that line pressure becomes effective to hold it in such position.

In many cases, the surfaces on the inner ends of the seats and the valve member are worn or scored so that it is difficult to seal between them. Therefore, valve seats are often "lubricated" by means of a viscous grease contained within a groove about the inner end of the seat to provide a film over the surface of the valve member opposite the groove. For this purpose, a conventional "grease gun" is attached to a fitting on the valve body which connects with passageways in the valve body and seat for conducting the lubricant to the groove at a desired pressure.

When the seats are pressure energized, the force with which each is urged against the valve member is, of course, dependent on the pressure differential across the seat. Thus, in the event this differential is low, such force may not be sufficient to maintain a seal between the inner end of the seat and the valve member, even when the seat is lubricated.

In order to stop such leaks, it has also been proposed to provide the seat with an area which is exposed to the lubricant pressure and which faces outwardly or away from the valve member to provide an additional force urging the seat inwardly toward seating position. More particularly, this area has been made larger than the oppositely facing area circumscribed by the inner and outer diameters of the groove on the inner end of the seat so as to provide a resultant force toward the valve member.

Although such an arrangement may overcome the leakage problem, it creates others when there is no control over the degree to which the lubricant is pressurized. Thus, when the lubricant pressure so applied is excessive, the seat may be forced against the valve member so tightly as to make it difficult to turn, and, in some cases, to actually injure the sealing surface of the valve member. Furthermore, when the lubricant is introduced into passageways connecting with an area about an outer diameter of the seat, as may be desired in the case of some types of valves, its pressure may become so high as to distort or even collapse the seat radially inwardly.

An object of this invention is to provide a valve having lubricated seats of such construction as to overcome these problems of excessive lubricant pressure, while at the same time maintaining the above-described advantages of prior valves of this type.

A more particular object is to provide a valve with a lubricated seat which has a groove on its inner end to provide a film of lubricant over the sealing surface of the valve member as well as an area thereon responsive to the pressure of such lubricant for urging the seat toward seated position, but which nevertheless is so constructed and arranged as to relieve the lubricant when the pressure thereof becomes excessive.

Another object is to provide a means for relieving excessive lubricant pressure which is particularly well suited for use with a valve of the character above described in which such lubricant is introduced into passageways in the valve body and seat connecting with an area about an outer diameter part of the seat.

These and other objects are accomplished, in accordance with the illustrated embodiment of the present invention, by a valve having a lubricated valve seat which, similarly to many prior valves of this type, includes an annular body having seal rings about axially spaced-apart outer diameter portions thereof for sealing between such body and the flowway through the valve body. Furthermore, the lubricant passageways in the valve body and seat body connect with the flowway and the outer diameter of the seat body, respectively, intermediate the seal rings to confine the lubricant for flow into the seat body passageway and the groove at the inner end of such seat body. More particularly, the inner of the spaced outer diameter sealing portions is larger than the outer of such portions so as to provide an outwardly facing area in the seat body which is responsive to the pressure of the lubricant to drive the inner end of the seat toward the valve member.

As distinguished from prior valves of this type, however, one of the seal rings is movable axially toward and away from sealing position between the seat body and flowway, and is urged toward sealing position by a means which is yieldable to permit it to move out of sealing position in response to excessive lubricant pressure within the space between the seal rings. Thus, by means of this invention, it is possible to so design the movable seal ring and the yieldable urging means as to relieve lubricant pressure before the seating or driving force on the seat is so great as to make the valve member difficult to move or to actually injure the valve member. Still further, the above-described valve seat construction makes it possible to relieve lubricant when the pressure thereof becomes so much greater than the line pressure within the valve seat as to distort the seat radially inwardly. In fact, as previously indicated, this seat construction is of particular value in this latter respect in that it relieves lubricant from the annular space between the seal rings. Thus, in the event the passageway in the seat body connecting the sealed off annular space with the groove becomes clogged, excessive lubricant pressure is nevertheless relieved since the one seal ring moves responsive to pressure of such lubricant within the annular space.

Another distinct advantage of the illustrated embodiment of the invention is that the valve is of extremely simplified construction since one of the spaced seal rings necessary for closing off the lubricant space between the seat body and flowway performs the additional function of relieving the lubricant pressure. In this respect, it is preferred that this seal ring engage with an outwardly facing shoulder on the seat body in sealing such body and the flowway, because, in this way, the resilient means for urging such ring to sealing position also functions to initially urge the inner end of the valve seat against the valve member.

In the drawings, wherein like reference characters are used throughout to designate like parts:

FIG. 1 is a longitudinal sectional view of a valve having lubricated seats constructed in accordance with the present invention, and with the valve member thereof in flowway opening position; and FIG. 2 is an enlarged sectional view of part of one of the seats and part of the valve body of the valve of FIG. 1, but with the valve member moved to flowway closing position.

With reference now to the details of the above-described drawings, the valve shown in FIG. 1, and designated in its entirety by reference character 10, includes a valve body 11 having a flowway 12 therethrough and a valve member 13 movable within the body for opening and closing the flowway. More particularly, the valve member 13 has an opening 14 through a ball-shaped closure 15 thereof and upper and lower stems 16 and 17, respectively, on such closure to permit it to be rotated between positions in which the opening 14 is aligned with the flowway 12 to open same (FIG. 1) and in which a solid portion of the closure 15 of the valve member is disposed across the flowway to close same (FIG. 2).

The valve body 11 includes a central portion 18 having bearings 19 and 20 on the upper and lower sides thereof, respectively, for receiving the valve member stems 16 and 17. As shown in FIG. 1, the stem 16 extends through the bearing 19 to provide an external part for actuating the valve member. The inner surface of this central portion is shaped spherically and concentrically of the outer surface of ball-shaped closure 15 of valve member 13 to provide a cavity fitting closely thereabout.

The valve body 11 also includes tubular extensions 21 connected by welding 22 to the opening in each opposite end of central body portion 18. These tubular extensions have flanges 23 on their outer ends for connecting the valve in a pipeline and annular recesses 24 on their inner ends adjacent the valve member 13 for receiving seats 25 adapted to seal against opposite sides of the valve member in the closed position thereof. As shown in FIG. 1, the openings 26 through the seats are the same diameter as the valve member opening 14, and the openings 14 and 26 are in turn of the same diameter as the flowway 12 through the tubular extensions 21 of the valve body, so that the valve is "full opening" in the position of FIG. 1.

As described more fully in U.S. Pat. No. 3,157,190, the central portion 18 of the valve body 11 may be split along a plane passing through the axis of the flowway and perpendicular to the axis of rotation of the valve member, and the split parts then assembled over the stems 16 and 17 and welded to one another to capture the valve member. At this time, the seats 25 may be assembled within the recesses 24 of each tubular extension 21, and the extensions and the seats moved into positions for mounting the seats and forming the welds 22 connecting the tubular extensions 21 to the openings in opposite sides of central portion 18 of the valve body. This, of course, also captures the seats against removal from the valve body except upon destruction of the welds 22.

As best shown in FIG. 2, the inner end of each tubular seat retainer 21 has a flange 27 disposed radially outwardly of the recess for seat 25 for fitting within a notch 29 about the opening through valve body portion 18. More particularly, the tubular extension 21 has a surface 30 which tapers outwardly from the flange 27 to provide a space between it and an outwardly facing surface 31 of the end of central body portion 18 to thereby define an annular groove to receive and also hold the central portion of the body and the tubular extension in properly aligned positions as the weld metal is being applied.

In its preferred form, the valve 10 also includes a means for rotating each seat 25 about its axis in response to operation of the valve so as to distribute wear about the seat. Thus, as shown in FIG. 1, a dog 32 is carried on each upper side of the valve member 13 for engaging with and disengaging from teeth 33 about the periphery of the seat 25 as the valve member is rotated between opened and closed positions. A detailed explanation of the construction and operation of these parts can be found in the aforementioned copending application.

As shown in FIG. 2, each seat 26 of this first embodiment of the invention includes an annular one-piece body 34 having a groove 35 in its inner end for disposal opposite the valve member 13. As previously mentioned, this groove is adapted to contain a viscous grease to provide a sealing film across oppositely disposed surface of the valve member. For this and other purposes to be described, the body 34 of the seat has a passageway 45 therein for connecting the groove with a passageway 36 in the valve body to which a fitting 37 is connected to permit lubricant to be injected through the passageway and into the groove at a desired pressure. Thus, the outer end of the valve body passageway 36 has threads 38 thereabout to receive threads 39 of the fitting, which may be of conventional construction including a hollow body 40 having a restricted opening 41 into an enlarged chamber 42 and normally closed by a spring-pressed ball 43. The outer end of the hollow body is threaded or otherwise prepared to receive a conventional grease gun.

The inner end of valve body passageway 36 connects with the flowway 24 and the outer end of seat body passageway 45 connects with the outer diameter of the seat body at a location substantially opposite to the inner end of passageway 36. A seal ring 46 about the seat body 34 seals between the body and flowway to the left or on the inner side of the ends of passageways 36 and 45 and a seal ring 47 seals between the body and flowway to the right or one the outer side of the ends of such passageways. Thus, lubricant is confined for flow from the passageway 36 through the passageway 45 into the groove 35.

More particularly, the seal ring 46 comprises an O-ring located between an outwardly facing shoulder 46a on the seat body and an inwardly facing shoulder 46b on the flowway. When the O-ring is urged towards the seat body shoulder 46a by means of lubricant within the sealed off space, it is confined against flow past the seat body by a retainer ring between the O-ring and shoulder. When the O-ring is so confined, lubricant within the sealed off space will urge it inwardly into tight sealing engagement between the seat and valve body.

The seal ring 47, on the other hand, is of triangular cross section and is adapted to seat upon an inwardly tapering shoulder 48 on the outer end of the seat body 34. More particularly, the seal ring 47 has an inner tapered surface corresponding to the taper of the shoulder 48 and an outer cylindrical surface corresponding to the cylindrical surface of the portion of the flowway 24 opposite the ring 47. Thus, as will be apparent from FIG. 2 and as distinguished from O-ring 46, the seal ring 47 is free to move axially out of sealing engagement between the seat body and flowway of the valve body.

The seal ring 47 is urged into sealing engagement between the seat body and flowway of the valve body by means of a washer type spring 49. As shown in FIG. 2, the radially outward end of the washer spring engages with a follower ring 49a to urge it against the outer end of the sealing ring 47. The radially inward end of the spring 49 is engaged by a tubular retainer 50 which is welded or otherwise secured to the valve body at 51. In this manner, the spring is held in a position urging the seal ring 47 into sealing engagement between the seat and flowway of the valve body with a desired force. As can be seen from FIG. 2, the inner diameter of the tubular retainer 50 is the same as the inner diameter through the flowway 12 and opening 26 through the seat 25.

In view of the foregoing description, it will be obvious that the O-ring 46 forms a sliding seal about the seat body along an outer diameter corresponding to the enlarged portion of the flowway through the valve body with which it engages. The seal ring 47, on the other hand, forms a seal with the flowway 24 along a reduced diameter portion thereof so as to provide an outwardly facing annular area on the seat body which is responsive to lubricant pressure to urge the inner end of the seat against the valve member. Depending upon the nature of the material of which ring 47 is formed, the inner limit of this outwardly facing area will lie somewhere between the reduced diameter portion of the flowway and the innermost diameter of seal ring 47.

A seal ring 52 on the inner end of the seat body 34 has an inner end protruding therefrom to initially engage the valve member 13. The seal ring 52 is moved to this position by means of the spring 49 acting through the seal ring 47 and the valve body 34. As can be seen from FIG. 2, the outer diameter of O-ring 46 is at least as large as the outer contact surface of seal ring 52, so that when the upstream pressure within the seat 25 is higher than the downstream pressure within the body cavity, such predominant pressure will act over the outer end of the seat body as well as the O-ring 46 to provide an additional force urging the inner end of the seat against the valve member.

In the event there is leakage past the seat 25, the lubricant system may be brought into operation by the injection of lubricant at a suitable pressure through the fitting 37. As previously described, such lubricant is conducted through the passages 36 and 45 into the groove 35 where it forms a film over the oppositely disposed surface of the valve member. Additionally, the lubricant pressure acts over an outwardly facing area at least as large as the cross-sectional area of O-ring 46 so as to urge the inner end of the seat body against the valve member.

At ordinary pressures, the lubricant will be contained by means of the O-ring 46 and the O-ring 47. However, in the event the pressure becomes so excessive as to threaten damage to the valve member or, as previously noted, distortion of the seat 25, the spring 49 is so designed and mounted as to permit the seal ring 47 to move axially outwardly from sealing position so as to relieve the lubricant from the space between the seal ring 46 and 47.

More particularly, the lubricant pressure will act over a portion of the inner end of seal ring 47 to provide an outwardly directed force which is opposed by the spring 49 as well as the line pressure acting over the outer end of the seal ring. Thus, it is possible to predetermine the lubricant pressure at which the seal ring 47 will move out of sealing position since the force at which this occurs is directly proportional to the force of the spring 49. Obviously, only a small amount of movement axially outwardly is required to relieve the lubricant so that the spring 49 may return the seal ring 47 to seating position when the lubricant pressure is brought down to the proper level.

As previously noted, this means for relieving lubricant pressure is especially well adapted for use with a valve seat of the type described, because the relief occurs from the annular space between the seal rings about the valve seat. Thus, in the event the passageway 45 is clogged or restricts the passage of lubricant therethrough, the seal ring 47 is nevertheless responsive to the rise in pressure upstream of the passageway 45. Also, this means for relieving lubricant requires no parts, other than the spring 49, in addition to the spaced seal rings 46 and 47 for confining the flow of lubricant from the valve body into the valve seat. Still further, the seal ring 49 performs the additional function of initially urging the protruding end of seal ring 52 into engagement with the valve member, thereby eliminating the need for any such resilient means at another location in the valve.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough, a valve member movable within the body for opening and closing the flowway, an annular seat within the flowway on one side of the valve member, said seat comprising an annular body having a groove about its inner end, a passageway in the valve body connecting the exterior thereof with the flowway, a passageway in the seat body connecting the exterior thereof with the groove, seal rings engaging between the flowway and the exterior of the seat body on opposite sides of the connections of the passageways with the flowway and seat body exterior, respectively, to confine the flow of lubricant from the valve body passageway through the seat body passageway into the groove and provide an outwardly facing area on the seat body which is responsive to the lubricant pressure for urging the inner end of the seat against the valve member, one of said seal rings being movable out of sealing engagement between said flowway and seat body to relieve lubricant from between said seal rings, and means for urging said one of said seal rings into said sealing engagement and yieldable to permit it to move out of said sealing engagement when the pressure of the lubricant reaches a predetermined value.

2. A valve of the character defined in claim 1, wherein said seal rings are spaced apart axially of the seat body with said one seal ring being disposed outwardly of the other.

3. A valve, comprising a body having a flowway therethrough, a valve member movable within the body for opening and closing the flowway, an annular seat within the flowway on one side of the valve member, said seat comprising an annular body having a groove about its inner end, axially spaced-apart first and second seal rings about the body to provide sliding seals with the flowway along enlarged and reduced diameter portions of the seat body, respectively, the enlarged diameter portion being disposed axially inwardly of the reduced diameter portion to provide an outwardly facing pressure responsive area on the seat body, a passageway in the valve body connecting the exterior thereof with the flowway intermediate the seal rings for introducing lubricant into the space between said rings, a passageway in the seat body connecting the exterior thereof intermediate the seal rings with the groove for conducting lubricant from the space into the groove, and means acting between the valve body and second seal ring for urging said second ring into sealing engagement between the seat body and flowway and being yieldable to permit said second seal ring to move out of sealing engagement and thereby relieve the lubricant pressure when it reaches a predetermined value.

4. A valve, comprising a body having a flowway therethrough, a valve member movable within the body for opening and closing the flowway, an annular seat within the flowway on one side of the valve member, said seat comprising an annular body having a groove about its inner end and an outwardly facing shoulder thereabout, axially spaced apart first and second seal rings about the body to provide sliding seals with the flowway along enlarged and reduced diameter portions of the seat body, respectively, a passageway in the valve body connecting the exterior thereof with the flowway intermediate the seal rings for introducing lubricant into the space between said rings, a passageway in the seat body connecting the exterior thereof intermediate the seal rings with the groove for conducting lubricant from the space into the groove, said first seal ring being disposed axially inwardly of the second seal ring to provide an outwardly facing pressure responsive area on the seal body, the second seal ring being sealably engaged between the outwardly facing shoulder about the seat body and the flowway, and means acting between the valve body and second seal ring for urging said second seal ring into sealing engagement with said shoulder and flowway, said last-mentioned means being yieldable to permit said second seal ring to move out of sealing engagement and thereby relieve the lubricant pressure when it reaches a predetermined value.

References Cited by the Examiner

UNITED STATES PATENTS

| | | | |
|---|---|---|---|
| 2,030,458 | 2/1936 | McKellar | 137—246.22 |
| 2,628,060 | 2/1953 | Parker | 251—174 |
| 2,837,308 | 6/1958 | Shand | 251—174 |
| 3,078,865 | 2/1963 | Estes | 137—246.12 X |
| 3,097,823 | 7/1963 | Kaiser | 251—172 |
| 3,123,078 | 3/1964 | Brooks | 137—246.22 |
| 3,215,157 | 11/1965 | Anderson | 137—246 |
| 3,241,808 | 3/1966 | Allen | 137—330 X |

CLARENCE R. GORDON, *Primary Examiner.*